United States Patent [19]

Bowen

[11] 4,300,534
[45] Nov. 17, 1981

[54] SOLAR COLLECTOR WITH MODIFIED PLUMBING AND ARRAY THEREOF

[75] Inventor: John C. Bowen, Huntingdon Valley, Pa.

[73] Assignee: Ametek, Inc., Paoli, Pa.

[21] Appl. No.: 99,490

[22] Filed: Dec. 3, 1979

[51] Int. Cl.³ .................................................. F24J 3/02
[52] U.S. Cl. .................................... 126/432; 126/417
[58] Field of Search ............ 126/444, 417, 416, 418, 126/437, 452, 450, 446, 432; 165/175, 176

[56] References Cited

U.S. PATENT DOCUMENTS

| | | | |
|---|---|---|---|
| 3,799,145 | 3/1974 | Butterfield | 126/437 |
| 3,952,724 | 4/1976 | Pei | 126/271 |
| 3,965,887 | 6/1976 | Gramer | 126/450 |
| 4,027,653 | 6/1977 | Meckler | 126/271 |
| 4,027,821 | 6/1977 | Hayes | 126/271 |
| 4,055,163 | 10/1977 | Costello | 126/271 |
| 4,060,071 | 11/1977 | Chayet | 126/271 |
| 4,122,830 | 10/1978 | Hapgood | 126/271 |
| 4,143,644 | 3/1979 | Heitland | 126/444 |
| 4,214,574 | 7/1980 | O'Hanlon | 126/446 |
| 4,239,035 | 12/1980 | Brooks | 126/452 |

Primary Examiner—Albert W. Davis
Assistant Examiner—G. Anderson
Attorney, Agent, or Firm—Paul F. Prestia

[57] ABSTRACT

The invention relates to solar collectors which transfer thermal energy from a collector to a point of use by means of a heat exchange fluid. An array of collectors may be provided having a modified system to facilitate convenient assembly into an array and to provide balanced fluid flow across the array. The outlet conduit sized to insure the steady flow of fluid and air thus preventing the accumulation of air to the outlet to block fluid flow.

5 Claims, 3 Drawing Figures

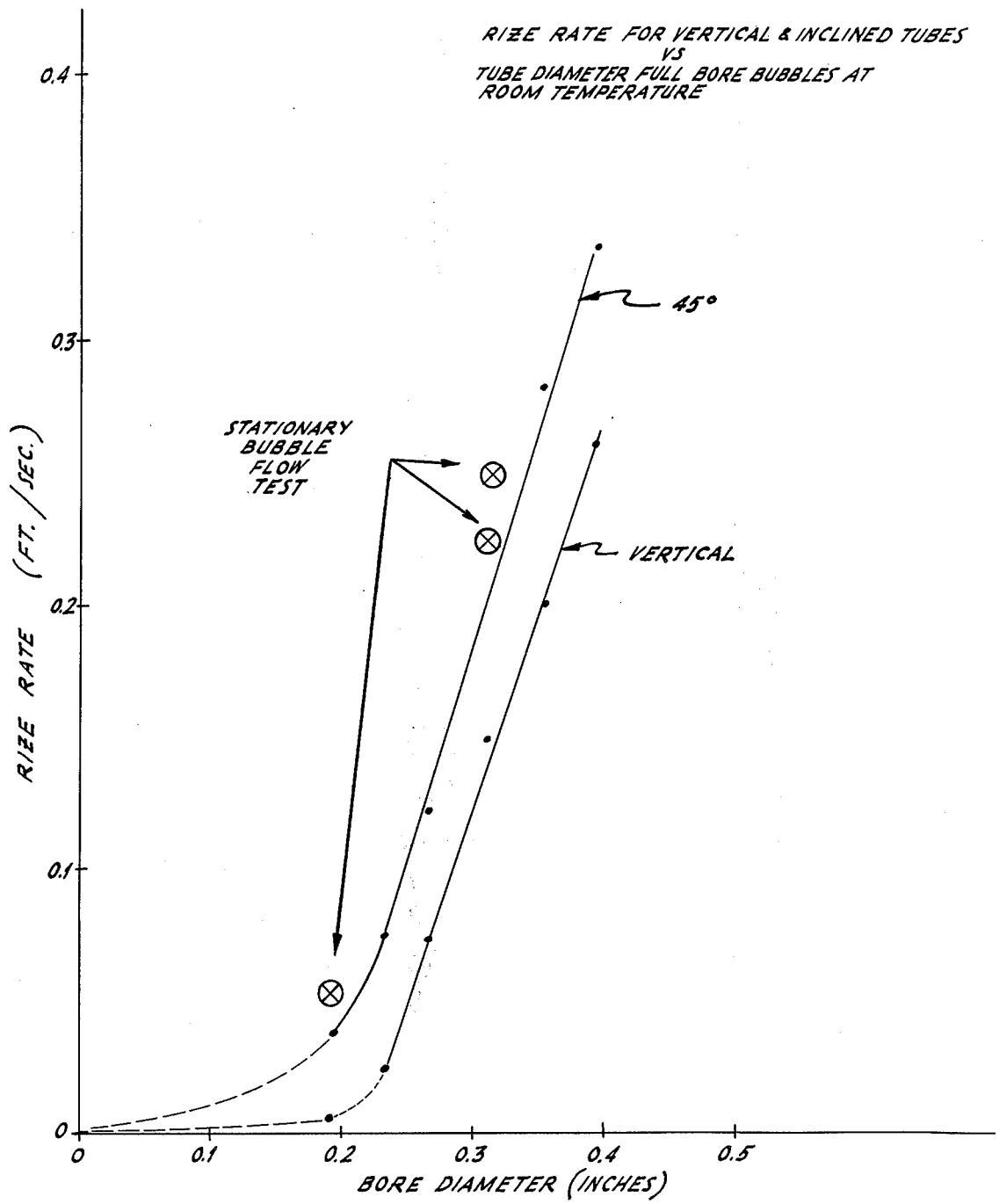

SOLAR COLLECTOR WITH MODIFIED PLUMBING AND ARRAY THEREOF

BACKGROUND OF THE INVENTION

The present invention relates to a solar collector in which solar energy is transferred into thermal energy of a fluid which is transmitted therefrom to a point of use. This invention relates also to an array of such solar collectors, the solar collector in all cases including a modified plumbing system to facilitate more convenient assembly into an array and to provide balanced fluid flow across the array.

The solar collector generally comprises a flat plate disposed in an enclosure with a transparent face to receive thermal energy. The plate is in thermal contact with conduits for heat transfer fluid, which fluid is heated by thermal energy striking the plate and conducted from the enclosure by transmission of the fluid to a remote point of storage or use.

While such collectors are sometimes schematically shown as if the inlet and outlet for the heat transfer fluid is disposed on a common side of the collector (see for example FIG. 9 of U.S. Pat. No. 4,051,833-Vandament), all known actual collectors and collector arrays are devised with their inlet and outlet openings on opposite sides of each collector so that the heat transfer fluid makes a simple unidirectional pass through the collector. At least one reason for this is to avoid an accumulation of air or vapor in the heat exchange fluid conduit of the collector which might block fluid flow in the collector, rendering it ineffective and susceptible to overheating. Thus, such unidirectional flow within each collector was considered a practical necessity prior to the present invention. But the present invention with bidirectional flow in each collector has now operated for many months with no perceivable malfunctions or problems due to the modified plumbing of the collectors. This result has been found surprising by certain persons familiar with solar energy collectors and collector array systems.

Another problem that presents itself in solar arrays is uniformity of flow through each collector. In most arrays, even flow is dependent on the manifold size and the pressure drop through the collector. Graduated manifolds are often used in an attempt to produce even flow. Even when these solutions are used, purging the air out of the system on initial filling is a requirement in order that air blockage does not occur. The present invention overcomes these shortcomings by providing a controlled back pressure in each collector of the array.

Inasmuch as the present invention depends upon a reduced diameter downflow conduit (or conversely, a high velocity fluid return conduit) within the collector to carry bubbles or vapor collections downward to the outlet in the solar collector of the present invention, the prior art deemed the most relevant is the hydronic heating system art, in which it is known to use high fluid velocity as a means of removing entrained air, and U.S. Pat. No. 4,122,830-Hapgood, wherein a reduced diameter high fluid velocity return conduit is used in a solar collector array for the same purpose. In each case, however, the high velocity conduit is part of the external plumbing to which is connected a plurality of heating or heat collecting elements (namely solar collectors in the Hapgood system). Hapgood in particular does not in any way suggest or imply a possible simplification of the system there described or an improvement over that system by the inclusion of a high velocity downflow conduit within each collector. Rather, considering the other objectives of the Hapgood disclosure, it is clear that Hapgood had in mind only, and might indeed be inferred to be limited to collectors with the inlet and outlet on opposite sides thereof (see Hapgood Claim 1, lines 33 and 34).

A brief preliminary patentability search on the present invention identified the following patents to be of "some interest":

U.S. Pat. No. 3,952,724
4,051,833
U.S. Pat. No. 4,027,653
4,055,163
U.S. Pat. No. 4,027,821
4,060,071

This is not to imply that other relevant art is not available or that this search was exhaustive. Moreover, in the opinion of those responsible for this application, these patents are not sufficiently relevant to warrant separate discussion, beyond that above, with respect to patentability of the invention here disclosed and claimed. Nevertheless, copies of all of these patents are submitted for consideration in conjunction with the examination of this application.

BRIEF DESCRIPTION OF THE INVENTION

Briefly, this invention comprises a solar collector adapted to be sloped upwardly with the heat transfer fluid inlet along the lower edge thereof, the heat transfer fluid conduit passing in contact with the solar collector plate in the course of upward movement along the plate and thence downwardly through a straight return conduit of reduced diameter adapted to produce high fluid flow velocity of the heat transfer fluid within the heat transfer conduit, on the order of 3 feet per second, or more, to a heat transfer fluid outlet also located along the lower edge of the collector. To ensure that air or vapor bubbles are transported to the fluid return outlet and to best control back pressure in the collector (and thereby to control fluid pressure balance across the array), the return conduit should comprise a long tube of relatively smooth and uniform internal bore.

Preferably, the collector plate and heat transfer fluid conduit, as well as the return conduit for heat transfer fluid are located within an insulated solar collector housing or assembly. In the preferred embodiment of the invention, such a collector would be combined in an array of such collectors with simplified plumbing including a heat transfer fluid inlet line extending along the bottom of horizontally displaced collectors within the array and a heat transfer fluid outlet line parallel to the inlet manifold also conjoined with the collectors at outlets along the lower edges of each of the collectors in the array. In this manner, a solar collector array is provided wherein the entire plumbing system is concentrated along the lower horizontal edge of horizontally displaced collectors for ease of installation and maintenance.

Additionally, the length and diameter of the return conduit in each collector of the array should be adpated to provide a balanced fluid flow across the array. This is accomplished when the total fluid flow rate through the array is slightly in excess of that necessary to provide the total of the design throughout rates to all of the collectors in the array, and the back pressure at each collector inlet is slightly greater in column height of heat exchange fluid, than the vertical rise in that collector.

Another advantage of this arrangement is that with flexible tubes connecting the collector to the supply and return manifold (at the bottom of the collector) the tilt angle of individual collectors in an arrangement can be adjusted individually.

Detailed Description of the Invention With Reference to Drawings Illustrating Same This invention may be better understood by reference to the detailed description which follows taken in conjunction with the drawings in which:

FIG. 3 is a graph showing a relationship between the vertical rise rate of a bubble and the size of a conduit containing the bubble.

Figure 1:
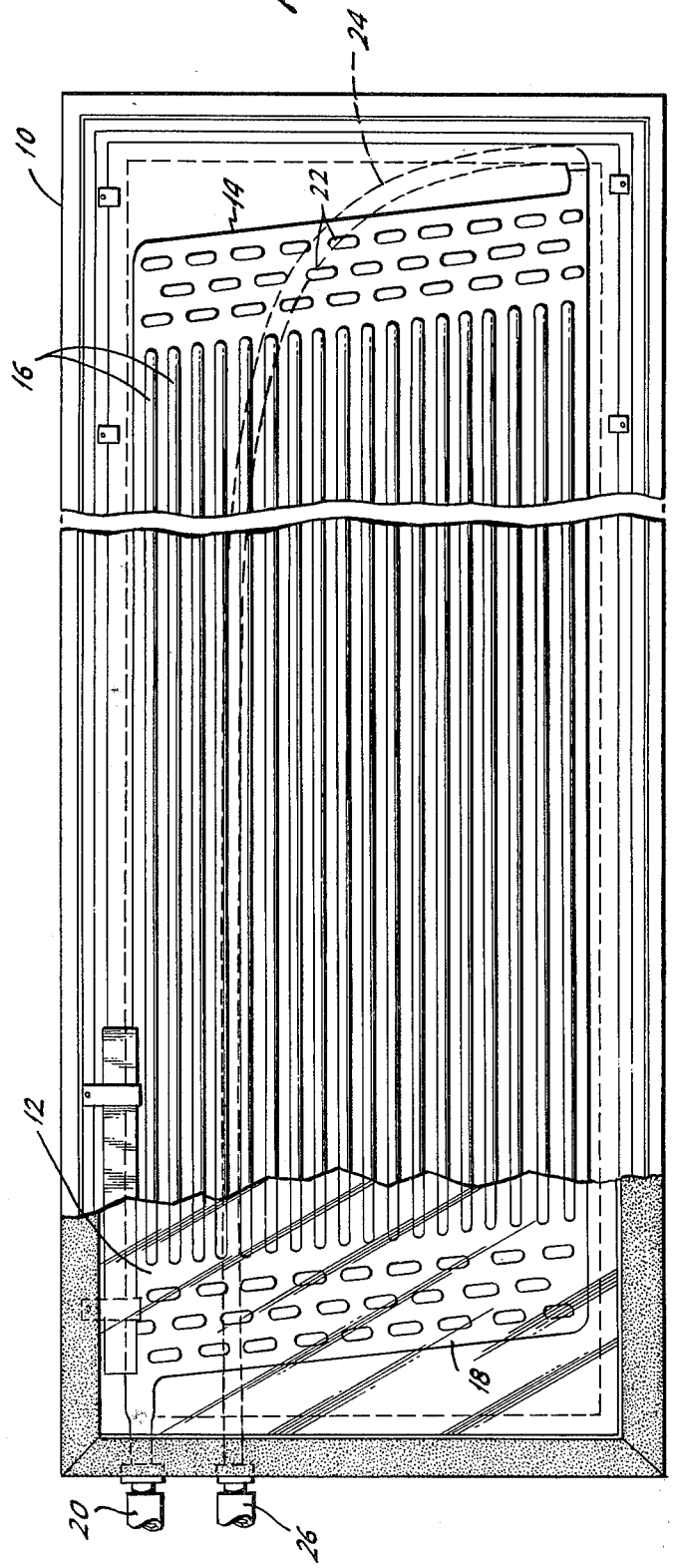
FIG. 1 is an assembled view of a solar collector, in accordance with the present invention.

Turning more specifically to FIG. 1, there is shown a solar collector housing or enclosure 10 with a front transparent face 12 and a solar collector plate 14 in thermal contact with a plurality of passageways 16 for heat transfer fluid, said passageways emanating from a collector inlet manifold 18 in turn connected to an inlet 20 at the lower edge of the collector 10. Passageways 16 terminate in an collector outlet manifold 22 near the top of the collector in turn leading to a straight heat transfer fluid return conduit 24 connected to a fluid outlet 26 at the bottom edge of the collector.

In accordance with the present invention, heat transfer fluid return conduit 24 is peculiarly adapted and designed, by virtue primarily of reduced diameter or cross section (with a relatively smooth, uniform bore) in relation to the volume of fluid otherwise handled by the collector and the fluid throughput of the collector, to maintain a high liquid velocity, namely on the order of 3 feet per second or more, in the downflowing straight return conduit to transport, by sweeping action, any vapor or bubbles collected in the heat transfer fluid contains or return passageway. In this manner, a collector is provided with the plumbing inlet and outlet for the heat transfer fluid along one edge of the collector, while at the same time preventing bubble or vapor blockage of fluid flow in the collector, heretofore prevented only by the disposition of the inlet and the outlet for heat transfer fluid at opposite ends of the collector.

In addition, such a return conduit provides a back pressure to balance fluid flow across an array of such collectors as set forth below.

In a typical solar collector in accordance with the present invention, the collector enclosure is slightly larger than 3 feet wide and 8 feet long. Tilted at a 45° angle from vertical, the vertical rise in the collector is between 5.8 and 6 feet. Water, at an average temperature of 80° F. is the heat exchanger fluid, and moves through the collector at 14.7 pounds per hour per square feet of collector (collector surface 25.625 feet$^2$). With these conditions a fluid velocity of 5½ feet per second is attained. The return conduit then, with a length of about 10 feet, must have an inside diameter of 0.242 inches to produce a pressure drop of 6.2 feet of 80° F. water. This satisfies the necessary conditions that the return conduit pressure drop must be slightly more than the vertical rise of the collector and in excess of the terminal velocity of a bubble in the return tube (0.1 ft./sec. in a tube of 0.242 inches inside diameter at a 45° angle, from FIG. 3).

A more precise statement for specifying these conditions (relative to the required pressure drop in the return conduit to ensure balanced fluid flow across the array) is that the back pressure on the inlet manifold (pressure drop in the return conduit) must be of sufficient magnitude so that when (n-1) collectors have (n/n-1)times the design flow rate, the back pressure in feet of liquid is equal to the height of the collector in feet plus a percentage for safety due to deviations in the flow rate from design pump curves and other practical considerations. This percentage should be in the range of 2–10%.

If a centrifugal pump, in which output varies with back pressure, is used as the heat exchange fluid circulator, the return conduit also limits the amount of flow that can be put through a collector. This is important in preventing high velocities in the plate where flow splitting occurs. Where flow splitting occurs, erosion corrosion of the collector plate can occur if the velocity is too high.

The collector plumbing arrangement of the present invention also has the advantage that in drain down, the solar array may be automatically vented by gravity, while in start up, air is automatically purged, as fluid is introduced.

At the same time, of course, the effectiveness of the collector of the present invention in preventing vapor locking in the heat transfer fluid circuit requires that the linear velocity of fluid in the downflow return conduit exceed the terminal velocity of a bubble in the heat exchange fluid in the return conduit, as determined in the above example by reference to FIG. 3.

Figure 2:
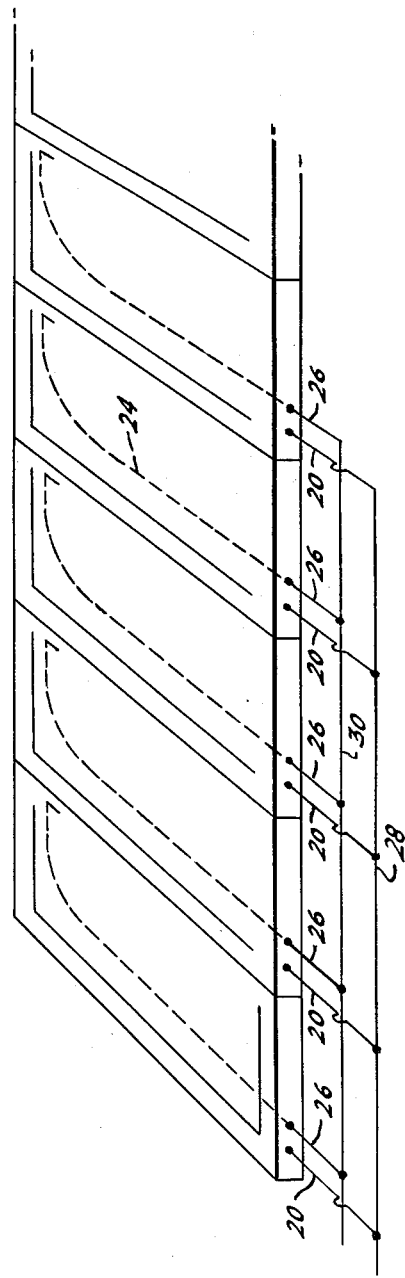
FIG. 2 is a schematic perspective view of an array of collectors of the type shown in FIG. 1, also showing diagrammatically the plumbing by which such collectors are interconnected in such an array.

Turning now to FIG. 2, there is shown an array of collectors, such as that seen in FIG. 1, wherein the plumbing for delivery of heat transfer fluid in its cooled state to the collectors is seen running parallel, along the bottom edge of the horizontally displaced collectors as an inlet line 28, connected respectively with the inlets of each of the collectors. An outlet line 30 running parallel thereto carries hot fluid and is connected to the outlets of each of the collectors. In this manner, with collectors as heretofore described, the array plumbing is simplified, draining of the array during nonuse is simplified, fluid flow across the collector array is balanced, and there is provided a solar collector system more practical than those heretofore known.

In the preferred embodiment of the present invention a high temperature plastic (namely a Union Carbide Corporation "Udel" polysulfone) tube is inserted as a liner at the entrance from the collector outlet manifold to the return conduit. This avoids erosion-corrosion which might otherwise occur at that high velocity transition point.

Use of flexible connectors at the inlet and outlet of a collector of the present invention facilitates tilt adjustment of the collector, since plumbing connections at the top and bottom of a conventional collector must also be adjusted along with the tilt adjustment of the collector. This presents a considerable problem when one wants to adjust the tilt of several horizontal displaced collectors in an array, all linked by common plumbing.

While this invention has been described with reference to particular embodiments thereof, the appended claims are intended to be construed to encompass the invention throughout its true spirit and scope, notwithstanding such minor modifications and variations as may be devised by those skilled in the art without departing from its true spirit and scope.

I claim:

1. In a solar collector comprising an enclosure having a transparent front face, a solar energy collector plate spaced from and parallel to said front face, heat transfer fluid passageways in thermal connection with said plate, and heat transfer fluid inlet means and outlet means disposed to communicate with said passageways and to be connected with external heat transfer fluid plumbing through said enclosure, said external plumbing in turn being connected with a means for circulating heat transfer fluid to and from said collector at a predetermined rate, the improvement consisting of:

said collector being adapted to be mounted in a sloped position with said inlet means and said outlet means both located on a lower edge of said collector enclosure, said collector including a downflow conduit for receiving heat exchange fluid from said passageways and for conveying said fluid from said passageways to said outlet, said downflow conduit sized, relative to the fluid throughout rate of heat exchange fluid to and from said collector, to produce sufficiently high heat transfer fluid linear velocity in said return conduit to prevent air bubble or vapor blockage of said return conduit to prevent air bubble or vapor blockage of said passageways in said conduit within said enclosure by establishing a downflow velocity in said conduit in excess of the terminal velocity of a bubble in heat exchange fluid in said conduit.

2. An improved solar collector, as recited in claim 1, wherein said downflow conduit is sized to produce a pressure drop, in column height of heat exchange fluid, greater than the vertical height of said sloped collector at the design throughput rate of heat exchange fluid in said collector.

3. An improved solar collector, as recited in claim 1, wherein said inlet and outlet means comprises a flexible connection adapted to facilitate tilt placement and adjustment of said collector.

4. An improved solar collector, as recited with claim 1, wherein said downflow conduit, at its junction with said passageways, is lined with a plastic material adapted to avoid high fluid velocity-induced erosion corrosion thereat.

5. A solar collector array comprising a plurality of horizontally displaced collectors, as recited in any of claims 1-4, wherein the inlets of each of said collectors are connected to a horizontal heat transfer fluid conduit and the outlets of each of said collectors are connected to a horizontally disposed outflow conduit in parallel with said inflow conduit.

* * * * *